INVENTOR.
David H. Borwick

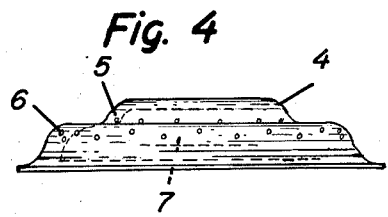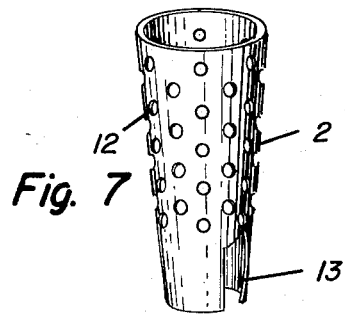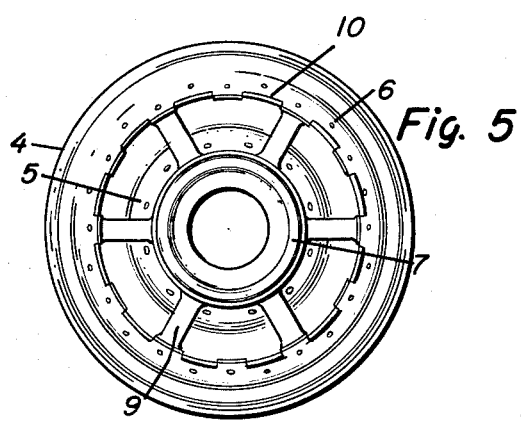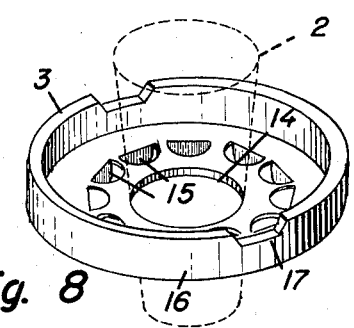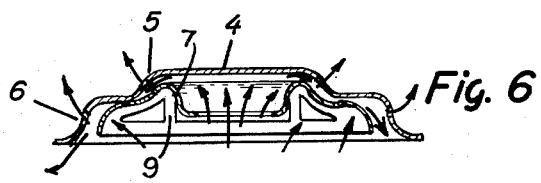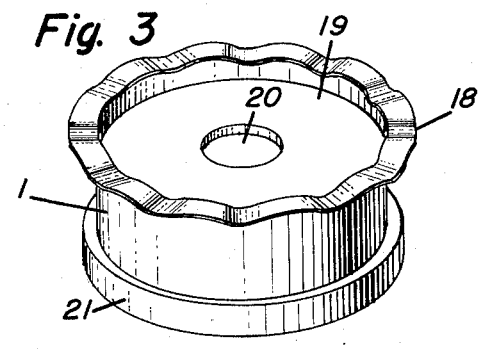

3,211,208
GAS BURNERS
David Harold Borwick, Rua Prudente de Morais 947,
Rio de Janeiro, Brazil
Filed June 4, 1962, Ser. No. 199,955
6 Claims. (Cl. 158—116)

The present invention applies to improvements in burners for gas stoves, incandescent lamps either fixed or portable, heaters, boilers, welding machines, welding torches, commercial and industrial ovens of all types, having the principal advantage that the gas-air mixture is supplied through a conduit means including an upstanding outlet portion terminating at a discharge end and a laterally extending portion coupled to said outlet portion at a junction between said portions spaced below the discharge end. The mixture is then channeled into a perforated truncated cone, which, because of its structure and placement, allows the gas-air mixture to be channeled there-into through orifices as well as through an open bottom and cut-out slot therein. This influx of gas-air mixture at several diverse points of entry into the cone, creates a cross-flow, and also includes a means for making the mixture whirl in the form of a spiral. The spiral gas-air mixture of the burner passes through the center hole in the base of the burner housing, spreading out through the orifices in the upper periphery of the said truncated cone, so as to thereby be forced against the teeth of a toothed disc. As the mixture is forced through the open spaces between the said teeth of the toothed disc, it forms split fractions or sections.

The split fractions or sectional tongues of gas are then forced out through the cuts or depressions existing in an undulating ring, to produce a circle of individual jets or ribbons of flame, said jets of flame having the length and shape according to the respective depth and detailed design of said undulating ring.

The part of the gas that remains in the upper portion of the burner continues on through the upper part of the burner cone, and through the top orifices of said burner. A spreader disc or distributor is adapted to the inside part of the burner cover or top, and is joined by simple pressure to the toothed disc. The said spreader disc possesses a small inverted dome, and radiating from the upper part of the spreader disc, are six bars equally spaced from each other. The gas enters the orifice in the center of the inverted dome, and passes through the said radiating bars of the said spreader disc, and the burner cover, then emerges through the upper and lower circles of orifices in the said burner cover.

Specifically, the advantages presented by the said type of burner are the following:

(1) The control of the direction of said gas-air mixture and the supply of gas-air mixture through the said orifices, resulting in giving a spiral impulse upward, creating an increased efficiency.

(2) The internal mechanism of the burner accomplishes the breaking up of the said gas-air mixture into small directed fragments or segments, each of which, therefore, acquires a better combustion quality, since these smaller fragments contain a better mixture of air and gas.

(3) The burner possesses exceptional total flame coverage, since the undulating ring produces a large circle of flame for heating the outer rim of the utensil that is being heated. The size and form of the flame spouts can be regulated by the circumference and depressions in the undulating ring. In addition to the lateral flame coverage, there also exists the output of flame on the sides and upper part of the cover of the burner. As the flames emerge from the orifices on the side of the cover, they heat the inner part of the utensil to be heated, and the flames emerging from the upper top orifices of the cover, will heat the center of the utensil. The upper part and the sides giving out heat, thus constitute a coverage consisting of a mass of flames.

(4) The construction and placement of the mechanical components of the burner, result in a large percentage of combustion of gas utilized. This added efficiency in the combustion of gas utilized, as a consequence, requires the utilization of a lesser quentity of gas in order to maintain a high temperature flame. Because of this, it is only necessary to open the gas register a small part of a turn in contrast with the much larger opening that must be given for the burners now used, in order to obtain the same size flame, or a hotter one. The employment of a lesser quantity of gas to obtain a hot flame and a larger one; results in a substantial economy in gas consumption.

(5) The quality of the flame is much better in the type of burner presented in this invention, due to the way the said burner is constructed. The ribbons of flame emerging, show colors of the hottest and most efficient combustion, that is, in the color scale of blue, green, violet, and orange.

(6) The use of this burner results in a considerable economy of gas, with the advantage of a flame that can be directed and dispersed in flames of predetermined sizes, and also, directed to predetermined angles and speeds.

Referring to the drawings illustrating the invention:

FIGURE 3 is a perspective view of the burner housing;

FIGURE 4 is a side elevational view of the cover or top part of the said burner;

FIGURE 5 is a bottom plan view of said cover;

FIGURE 6 is a cross section view of the said cover;

FIGURE 7 is a perspective view of the perforated truncated cone; and

FIGURE 8 is a perspective view of the toothed disc spreader, with the truncated cone being shown in dotted lines.

Figure 1:
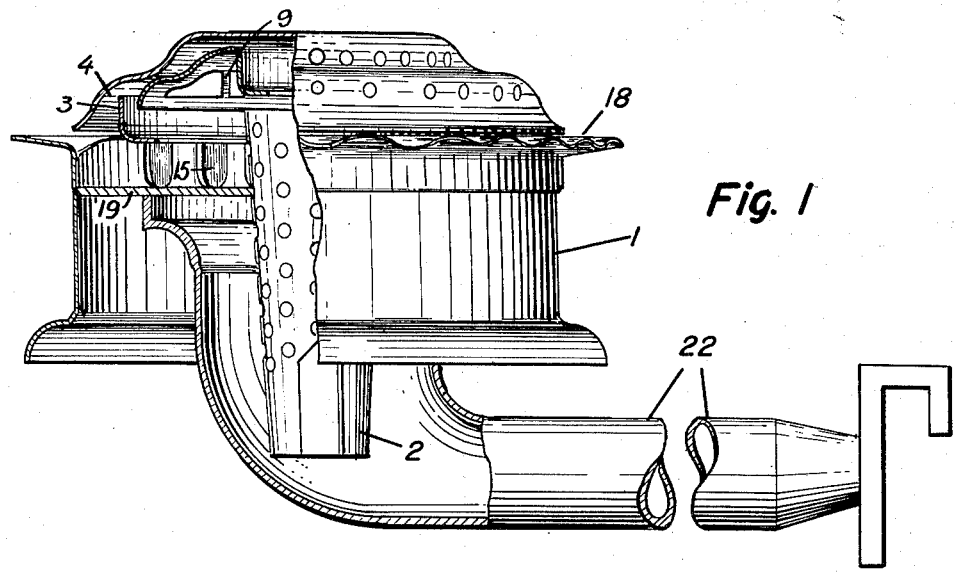
FIGURE 1 is a side elevational view, partly in section, of the burner unit fitted into a conduit means in the form of a gas supply tube in a gas stove.
Figure 2:
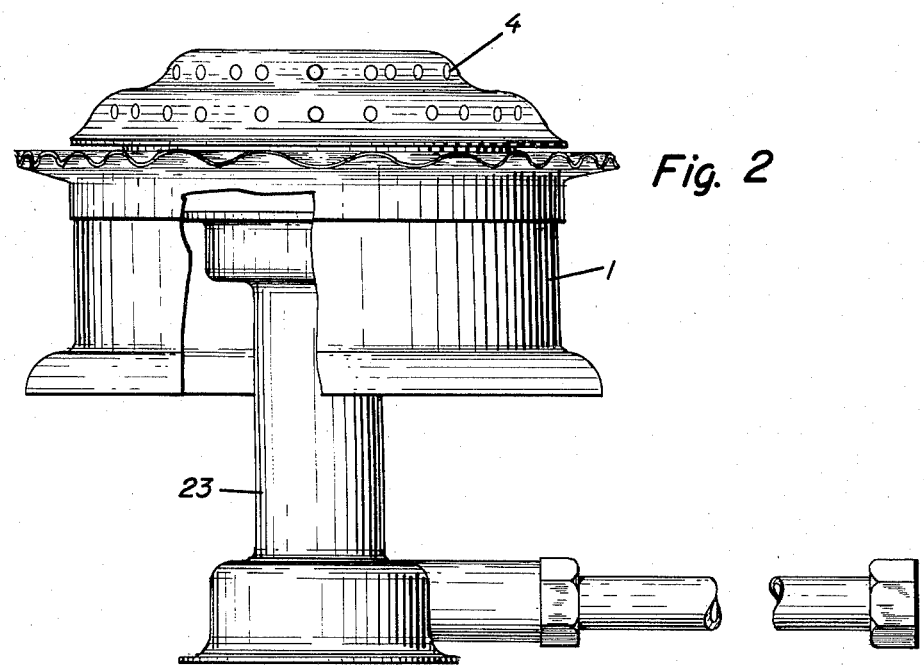
FIGURE 2 is a side elevational view, partly in section, of the same burner adapted to a support connected to the conduit means in the form of a gas supply pipe.

The said burner, therefore, consists as a unit, of the following parts:

(a) of a circular empty base or housing 1, containing a plate 19 having a circular orifice 20 therein; an undulating outer rim or ring 18 fixed to the said upper part of the housing, and a skirt 21, forming the lower part of the said housing;

(b) of a circular plate 3, provided with a center orifice 14, with the said plate 3 encircled in its upper part with an outer rim or ring wall 16. Semi-circular teeth 15 extend downwardly in surrounding relationship to the orifice 14, such teeth being spaced from each other to form open spaces there between. The upper edge of the ring wall 16 has two indentations 17, which are shaped to receive the zig-zag surfaces 10 on the underside of the inverted dome portion 7 of the cover 4. In this manner, the cover can be fastened by pressure to the said circular plate 3. A truncated cone 2, containing orifices 12 in the greater part of its surface, can be positioned in the said circular plate 3, by means of insertion into the said orifice 14 of said circular part 3. The extreme end of the truncated cone is cut open at 13 to permit gas-air mixture to enter therethrough whereby a swirling motion is imparted to the mixture due to the fact that the mixture enters into the slit 13 in a tangential manner.

The cover 4, is formed with orifices 5 and 6. The inverted dome 7 is provided with six radiating bars 9, out of which the gas emerges to pass through the said orifices 5 and 6, as shown in FIGURE 6, with the arrows. In the functioning of the said burner, the gas-air mixture that comes through the outlet conduit means is channeled into the said perforated truncated cone 2, and on reaching the said spreader 3, such mixture is forced to divide, one part going in the upper direction to the burner cover 4 to emerge through the orifices 5 and 6, and the other part between the teeth 15 in the plate 3. These teeth 15 break the mixture into fragments of gas with these fragments emerging through the space existing between the lower rim or edge of said cover 4, and the depressions of the undulating ring 18. The orifices 5 and 6, and the depressions of the undulating ring 18, are positioned, spaced, and small enough in size, so that flashback is thereby controlled.

In the drawings illustrating the present invention, the same numbers indicate the same parts.

It is evident that in the realization and construction of the present invention, there can be made certain modifications, without these altering its scope and meaning as described and detailed.

I claim:
1. A burner assembly comprising:
   (a) a combustible gas supply of the type having an outlet conduit means including an upstanding outlet portion terminating at a discharge end, and a laterally extending portion coupled to said outlet portion at a junction between said portions spaced below said discharge end;
   (b) a hollow truncated cone member having apertures distributed over the periphery thereof, said cone member having a lower portion terminating in a smaller diameter inlet end and an upper portion terminating in a large diameter outlet end;
   (c) sealing and supporting means for supporting said cone member with the lower portion and inlet end thereof disposed within said outlet portion of said supply conduit means in spaced relation to the interior thereof and said junction, and with the upper portion and outlet end of said cone member disposed above said discharge end of said upstanding portion of said conduit means;
   (d) enclosure means surrounding said upper portion of said cone member;
   (e) said sealing and supporting means cooperating with said discharge end of said outlet portion of said conduit means to cause all gas passing from said supply to travel at least partially through said cone member in passing to said enclosure means;
   (f) said enclosure means including a plurality of baffle means therein for directing gas travelling thereto through said cone member into a plurality of separate gas streams, said enclosure means having a plurality of groups of outlet openings therein, said groups of openings being spaced at different levels above said discharge end of said conduits means and at different lateral distances from said discharge end of said conduit means;
   (g) said lower portion of said cone member having an opening in the side thereof for laterally receiving gas directly from said laterally extending portion of said gas supply, the cone member and opening comprising a means to impart a swirling motion to the gas;
whereby gas travels initially into and at least partially through said lower portion of said cone member and then at least partially through the upper portion of said cone member into said enclosure means in a spiral path, and whereby the gas leaving said upper portions of said cone member is directed in individual streams toward the different groups of outlet openings in said enclosure means.

2. A burner head assembly for use with a combustible gas supply of the type having an outlet conduit means including an upstanding outlet portion terminating at a discharge end, and a laterally extending portion coupled to said outlet portion at a junction between said portions spaced below said discharge end, said burner head assembly comprising:
   (a) a hollow truncated cone member having apertures distributed over the periphery thereof, said cone member having a lower portion terminating in a smaller diameter inlet end and an upper portion terminating in a larger diameter outlet end;
   (b) sealing and supporting means for supporting said cone member with the lower portion and inlet end thereof disposed within said outlet portion of said supply conduit means in spaced relation to the interior thereof and said junction, and with the upper portion and outlet end of said cone member disposed above said discharge end of said upstanding portion of said conduit means;
   (c) enclosure means surrounding said upper portion of said cone member;
   (d) said sealing and supporting means being adapted to cooperate with said discharge end of said outlet portion of said conduit means to cause all gas passing from said supply to travel at least partially through said cone member in passing to said enclosure means;
   (e) said enclosure means including a plurality of baffle means therein for directing gas travelling thereto through said cone member into a plurality of separate gas streams, said enclosure means having a plurality of groups of outlet openings therein said groups of openings being spaced at different levels above said discharge end of said conduit means and at different lateral distances from said discharge end of said conduit means;
   (f) said lower portion of said cone member having an opening in the side thereof for laterally receiving gas directly from said laterally extending portion of said gas supply, the cone member and opening comprising a means to impart a swirling motion to the gas;
whereby gas travels initially into and at least partially through said lower portion of said cone member and then at least partially through the upper portion of said cone member into said enclosure means in a spiral path, and whereby the gas leaving said upper portions of said cone member is directed in individual streams toward the different groups of outlet openings in said enclosure means.

3. A burner head assembly as defined in claim 2 wherein said sealing and supporting means comprises a plate member fixed within said enclosure means and having an opening therein, the periphery of said cone member engaging said opening.

4. A burner head assembly as defined in claim 2 wherein said enclosure means comprises a circular housing, wherein said sealing and supporting means includes a plate member disposed within and extending across said housing, and wherein said baffle means includes an apertured disc member having said cone member passing therethrough, said disc member being supported on and above said plate member for directing gas leaving the portion of said cone member between said plate member and said disc member into individual gas streams above said disc member.

5. A burner head assembly as defined in claim 2 wherein said enclosure means includes a ring wall and a cover superimposed over one end of said ring wall, said cover having baffle members and at least one group of said openings therein, said ring wall and said cover member having an undulating ring surface at the junction therebetween, said undulating surface providing lateral openings in said enclosure means for distributing the gas peripherally thereof.

6. A burner assembly as defined in claim 2 wherein said opening in said cone member comprises a cut-out slot extending upwardly from said inlet end thereof for receiving gas directly from said laterally extending portion of said conduit means.

References Cited by the Examiner

UNITED STATES PATENTS

| | | | |
|---|---|---|---|
| 849,315 | 4/07 | Blanchard | 126—39 |
| 1,815,176 | 7/31 | Auter | 158—113 |
| 2,012,580 | 8/35 | Osborn | 158—116 |
| 2,409,129 | 10/46 | Lange | 158—99 |
| 2,565,039 | 8/51 | Mueller | 158—7 |
| 2,627,910 | 2/53 | Abrams | 158—118 |

FREDERICK L. MATTESON Jr., *Primary Examiner.*

PERCY L. PATRICK, MEYER PERLIN, JAMES W. WESTHAVER, *Examiners.*